US006851604B2

(12) United States Patent
Girotto et al.

(10) Patent No.: US 6,851,604 B2
(45) Date of Patent: Feb. 8, 2005

(54) METHOD AND APPARATUS FOR PROVIDING PRICE UPDATES

(75) Inventors: Jay R. Girotto, Kirkland, WA (US); Krishna Venkatraman, Menlo Park, CA (US); Rob Parkin, San Francisco, CA (US); Jeffrey B. Winner, Los Altos Hills, CA (US); Cristos J. Goodrow, Burlingame, CA (US)

(73) Assignee: Demand Tec Inc., San Carlos, CA (US)

( * ) Notice: Subject to any disclaimer, the term of this patent is extended or adjusted under 35 U.S.C. 154(b) by 0 days.

(21) Appl. No.: 10/264,314

(22) Filed: Oct. 2, 2002

(65) Prior Publication Data

US 2004/0094616 A1 May 20, 2004

(51) Int. Cl.[7] .............................................. G06K 15/00
(52) U.S. Cl. ....................... 235/378; 375/383; 375/381; 375/385; 705/1; 705/20; 705/21; 705/400
(58) Field of Search ................................. 235/375, 378, 235/381, 383, 385; 705/1, 20, 21, 400, 401, 16

(56) References Cited

U.S. PATENT DOCUMENTS

| | | | |
|---|---|---|---|
| 5,063,506 A | 11/1991 | Brockwell et al. ........... 364/402 |
| 5,117,354 A | 5/1992 | Long et al. .................. 364/401 |
| 5,249,120 A | 9/1993 | Foley .......................... 364/401 |
| 5,299,115 A | 3/1994 | Fields et al. ................. 364/401 |
| 5,377,095 A | 12/1994 | Maeda et al. |
| 5,459,656 A | 10/1995 | Fields et al. ................. 364/401 |
| 5,712,985 A | 1/1998 | Lee et al. .................... 395/207 |

(List continued on next page.)

FOREIGN PATENT DOCUMENTS

WO  WO 98/53415  11/1998

OTHER PUBLICATIONS lan L. Montgomery and Peter R. Rossi, "Estimating Price Elasticities with Theory– Based Priors," Journal of Marketing Research vol. XXXVI, Nov. 1999 (pp 413–423).
Boatwright, Peter et al., "Account–Level Modeling for Trade Promotion: An Application of a Constrained Parameter Hierarchical Model," Journal of the American Statistical Association, vol. 94, No. 448, Dec. 1999 (pp 1063–1073).
Alan L. Montgomery, "Creating Micro–Marketing Pricing Strategies Using Supermarket Scanner Data," Marketing Science, vol. 16, No. 4, 1997 (pp 315–337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp 304–315).
Arnold Zellner, "On Assessing Prior Distribution sand Bayesian Regression Analysis With G–Prior Distributions," Elsevier Science Publishers, 1986 (pp 233–243).
D.V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.

(List continued on next page.)

Primary Examiner—Michael G. Lee
Assistant Examiner—Steven S. Paik
(74) Attorney, Agent, or Firm—Kang Lim

(57) ABSTRACT

A computer implemented method and system for providing price updates is provided. Data is received by a system. The received data is filtered by the system to identify triggers in the received data. Actions related to identified triggers are performed by the system. Business rule compliance is performed according to a business rule hierarchy. Updated prices are provided.

17 Claims, 4 Drawing Sheets

U.S. PATENT DOCUMENTS

| | | | |
|---|---|---|---|
| 5,732,401 A | | 3/1998 | Conway ..................... 705/29 |
| 5,765,143 A | * | 6/1998 | Sheldon et al. ............... 705/28 |
| 5,790,643 A | * | 8/1998 | Gordon et al. .............. 379/119 |
| 5,799,286 A | | 8/1998 | Morgan et al. ............... 705/30 |
| 5,822,736 A | | 10/1998 | Hartman et al. ............... 705/1 |
| 5,873,069 A | * | 2/1999 | Reuhl et al. .................. 705/20 |
| 5,878,400 A | | 3/1999 | Carter, III .................... 705/20 |
| 5,918,209 A | | 6/1999 | Campbell et al. .............. 705/5 |
| 5,933,813 A | * | 8/1999 | Teicher et al. ................ 705/26 |
| 5,987,425 A | | 11/1999 | Hartman et al. .............. 705/20 |
| 6,009,407 A | | 12/1999 | Garg ........................... 705/10 |
| 6,029,139 A | | 2/2000 | Cunningham et al. ........ 705/10 |
| 6,032,123 A | | 2/2000 | Jameson ....................... 705/8 |
| 6,032,125 A | | 2/2000 | Ando .......................... 705/10 |
| 6,052,686 A | | 4/2000 | Fernandez et al. .......... 205/400 |
| 6,078,893 A | | 6/2000 | Ouimet et al. ................ 705/10 |
| 6,094,641 A | | 7/2000 | Ouimet et al. ................ 705/10 |
| 6,125,355 A | | 9/2000 | Bekaert et al. ............... 705/36 |
| 6,134,534 A | * | 10/2000 | Walker et al. ................ 705/26 |
| 6,173,345 B1 | | 1/2001 | Stevens ..................... 710/100 |
| 6,205,431 B1 | | 3/2001 | Willemain et al. ........... 705/10 |
| 6,308,162 B1 | | 10/2001 | Ouimet et al. .............. 364/401 |
| 6,341,268 B2 | * | 1/2002 | Walker et al. ................ 705/15 |
| 6,341,269 B1 | | 1/2002 | Dulaney et al. | |
| 6,397,193 B1 | * | 5/2002 | Walker et al. ................ 705/16 |
| 6,456,986 B1 | * | 9/2002 | Boardman et al. .......... 705/400 |

OTHER PUBLICATIONS

"PCT International Search Report", Application No. PCT/US03/30488, mailed Jan. 28, 2004.

Bruce G.S. Hardie et al., "Attribute–based Market Share Models: Methodological Development and Managerial Applications", University of Pennsylvania, Working Paper 98–009, pp. 1–48, 1998.

Rossi, Delorgio, & Kantor; "Making Sense of Scanner Data;" Harvard Business Review, Reprint F00205, 2000.

"Pacificorp IRP: Renewables Costs Must Drop 65% to be Competitive with Gas," dated Dec. 8, 1995.

Robert J. Dolan, "How Do You Know When the Price is Right?", Harvard Business Review, Sep.–Oct. 1995, P. 4–11.

"PCT International Search Report", Application No. PCT/US02/14977, mailed May 5, 2003.

Dyer, Robert F. et al., "Case Studies in Marketing Decisions Using Expert Choice," Decision Support Software, 1988, pp. 2–7, 73–108.

"PCT International Search Report", Application No. PCT/US02/36710, mailed Jul. 21, 2003.

Yoeman, John Cornelius Jr., "The Optimal Offering Price for Underwritten Securities", 1993, vol. 55/01–A of Dissertation Abstracts International, p. 4743 (Abstract Only).

"Report of Novelty Search"by Patentec, dated Feb, 9, 2001.

"Report of Novelty Search" by Patentec, dated Jul. 25, 2001.

Stephen J. Hoch et al., "Store Brands and Category Management", The Wharton School, University of Pennsylvania, Mar. 1998, pp. 1–38.

AIan Mercer, "Non–linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17–28.

Robert C. Blattberg et al., "How Promotions Work", Marketing Science, vol. 14, No. 3, Part 2 of 2, 1995, pp. G122–G132.

Peter M. Guadagni et al., "A Logit Model of Brand Choice Calibrated on Scanner Data", Marketing Science, vol. 2, No. 3, Summer 1983, pp. 203–238.

Lee G. Cooper et al., "Standardizing Variables in Multiplicative Choice Models", Journal of Consumer Research, vol. 10, Jun. 1983, pp. 96–108.

Eileen Bridges et al., "A High–Tech Product Market Share Model With Customer Expectations" Marketing Science, vol. 14, No. 1, Winter 1995, pp. 61–81.

Richard R. Batsell, et al., "A New Class of Market Share Models", Marketing Science, vol. 4, No. 3, Summer 1985, pp. 177–198.

Jagmohan S. Raju, "The Effect of Price Promotions on Variability in Product Category Sales", Marketing Science, vol. II, No. 3, Summer 1992, pp. 207–220.

Robert J. Dolan, "How Do You Know When the Price is Right?", Harvard Business Review, Sep.–Oct. 1995, pp. 5–11.

Fusun Gonul, "Modeling Multiple Sources of Heterogeneity in Multinomial Logit Models: Methodological and Managerial Issues", Marketing Science, vol. 12, No. 3, Summer 19932, p. 213–229.

Robert M. Schindler et al., "Increased Consumer Sales Response through Use of 99–Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83–90.

John Deighton et al., "The Effects of Advertising on Brand Switching and Repeat Purchasing", Journal of Marketing Research, vol. XXXI, Feb. 1994, pp. 28–43.

Sunil Gupta, "Reflections on 'Impact of Sales Promotions on When, What, and How Much to Buy'", Journal of Marketing Research, vol. XXX, Nov. 1993, pp. 522–524.

Richard A. Briesch, "Does it Matter How price Promotions Are Operationalized?", Marketing Letters 8:2 (1997), pp. 167–181.

Byung–Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment–level Model of Category Volume and Brand Choice", Marketing Science, vol. 15, No. 1, 1996, pp. 38–59.

Stephen J. Hoch et al., "Determinants of Store–Level Price Elasticity", Journal of Marketing Research, vol. XXXII (Feb. 1995), pp 17–29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of marketing Research, vol. XXXII (Nov. 1996), pp. 442–452.

Bucklin & Gupta, "Brand Choice, Purchase Incidence, and Segmentation: An Integrated Modeling Approach," Journal of Marketing Research, May 1992, pp. 201–215, vol. XXIX.

Smith, Mathur, & Kohn; Bayesian Semiparametric Regression: An Exposition and Application to Print Advertising;: Jan. 3, 1997; Australian Graduate School of Management, University of New South Wales, Sydnet 2025, Australia.

Blattberg and Deighton, "Manage Marketing by the Customer Equity," Harvard Business Review, Jul.–Aug. 1996, pp. 136–144.

Christen, Gupta, Porter, Staelin & Wittink; "Using Market-Level Data to Understand the Effectiveness of Promotional Activities;" Dec. 22, 1995.

Ross Link, "Are Aggregate Scanner Data Models Biased?," Journal of Advertising Research, Sep./Oct. 1995, pp. RC8–RC12, ARF.

Russell et al., "Understanding Brand Completion Using Micro and Macro Scanner Data," Journal of Marketing Research, vol. XXXI (May 1994), pp. 289–303.

John Philip Jones, "The Double Jeopardy of Sales Promotions," Harvard Business Review, Sep.–Oct. 1999, pp. 145–152.

Buzzell, Quelch, & Salmon; "The Costly Bargain of Trade Promotion;" Harvard Business Review, Reprint 90201, Mar.–Apr. 1990, pp. 1–9.

Curry, Divakar, Mathur & Whiteman; "Bvar as a Category Management Tool: An Illustration and Comparison with Alternative Techniques;" Journal of Forecasting, vol. 14, Iss. No. 3 (1995), pp. 181–199.

Montgomery: "The Impact of Micro–Marketing on Pricing Strategies", 1994 The University of Chicago vol. 55/12–A of Dissertation of Abstracts International, p. 3922 (Abstract Only).

Busch: "Cost Modeling as a Technical Management Tool", Research–Technology Management, Nov./Dec. 1994, vol. 37, No. 6, pp. 50–56.

* cited by examiner

METHOD AND APPARATUS FOR PROVIDING PRICE UPDATES

BACKGROUND OF THE INVENTION

The present invention relates to providing prices for items. More specifically, the invention relates to providing price updates for a subset of items.

In businesses, prices of various products must be set. In a store chain, prices may need to be set for thousands of items for thousands of stores.

Each week, new products are introduced or costs, competitor prices, and other price related factors change, which may make frequent price updates desirable. It would be desirable to provide a method and apparatus for providing price updates.

SUMMARY OF THE INVENTION

To achieve the foregoing, and in accordance with the purpose, a method for providing price updates is provided. Data is received. The received data is filtered to identify triggers in the received data. Actions related to identified triggers are performed. Business rule compliance is performed according to a business rule hierarchy. Updated prices are provided.

In another embodiment of the invention an apparatus for providing price updates comprising computer readable media is provided. A computer code for receiving data is provided. A computer code for filtering the received data to identify triggers in the received data is provided. A computer readable code for performing actions related to identified triggers is provided. A computer readable code for performing business rule compliance is provided. A computer code for providing updated prices is provided.

These and other features of the present invention will be described in more detail below in the detailed description of the preferred embodiments and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A system for providing price updates to a subset of items is provided. The price update may provide updates to prices that may be set according to an optimization program or may be set by other means. Price updating is an important pricing challenge due to the frequency at which prices are updated, the large number of events that may cause updating, and the large number of items that may need price updating.

Figure 1:
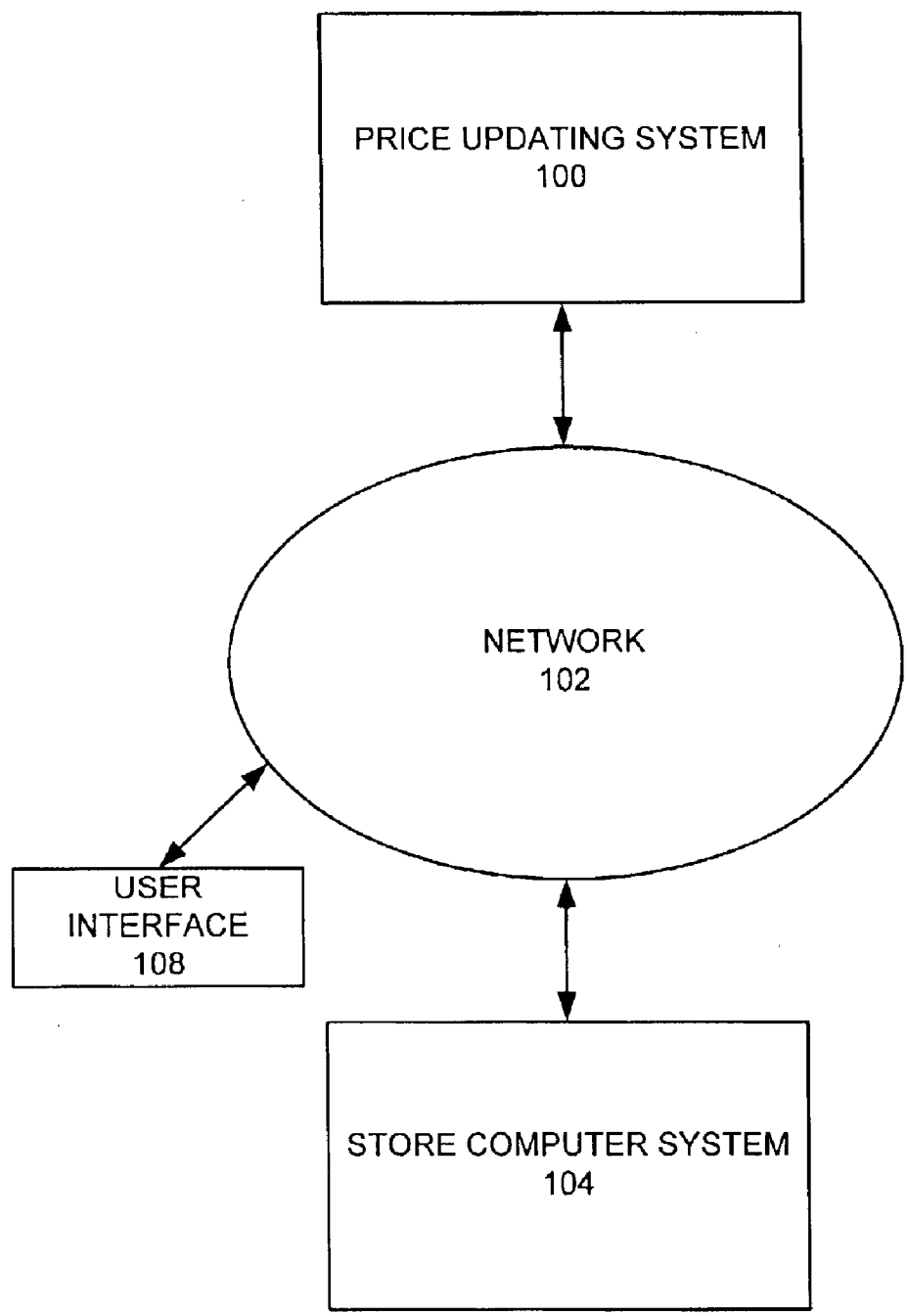
FIG. 1 is a schematic view of a system that is used in a preferred embodiment of the invention.

To facilitate discussion, FIG. 1 is a schematic illustration of a system that may be used in providing price updates. A price updating system 100 is connected to a network 102. A store computer system 104 is connected to the network 102 and communicates to the price updating system 100 through the network 102. The network 102 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 102 may also be a combination of private and/or public LANs and/or WANs. In such an embodiment, the price updating system 100 is connected to the network 102. The computer system for the store 104 is able to bi-directionally communicate with the price updating system 100 over the network 102.

Computer readable media may be used by the price updating system 100 to communicate over the network 102 to collect store specific information to provide price updates and to receive feedback and updated information.

Figure 2:
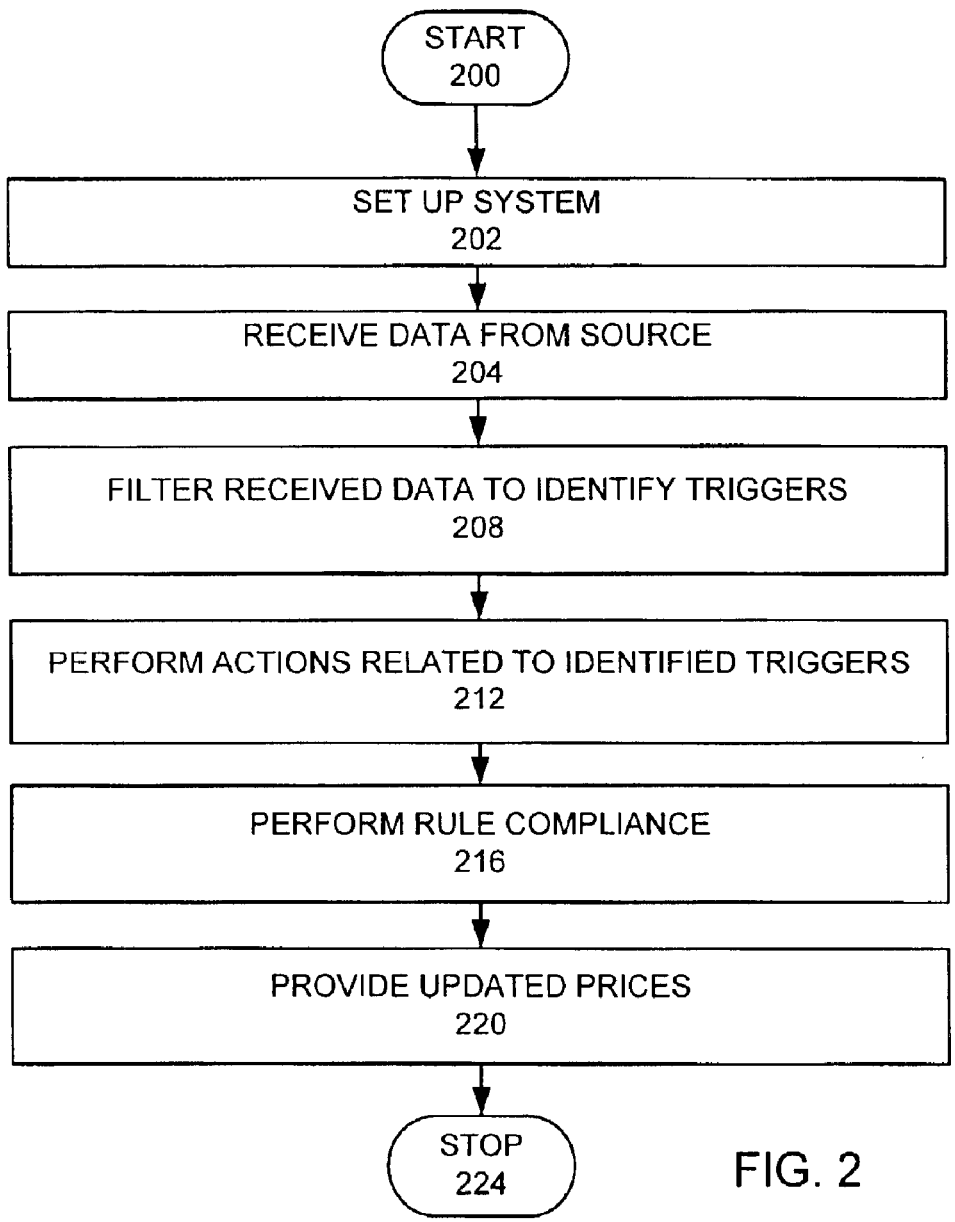
FIG. 2 is a high level flow chart of a process used in an embodiment of the invention.

FIG. 2 is a flow chart of a process that may be used in a preferred embodiment of the invention. A rule system is first set up (step 202).

In a preferred embodiment, the rule system uses the following terminology. A "Trigger" is a change in the environment beyond a threshold to which a retailer responds by an action. There are three kinds of triggers in this embodiment: product cost changes, competitive price changes, and new product introductions. An example of a trigger is when the cost of the product increases by more than 5%. A "Directly Affected Product" is a product on which a trigger acts. An "Action" is a set of pricing actions that is taken in response to a trigger. In this embodiment, the actions are to the directly affected product. An example of an action would be to set the price of the directly affected product to maintain the gross margin present prior to the increase in the cost of the product. "Business Rules" are rules that define pricing relationships. In this embodiment, business rules define a price relationship between different products or a group of products. An example of a business rule is a size rule that states that a larger size item should have a lower average unit cost than a smaller size item of the same size family. An example of a size family is Advil Caplets (a brand of a certain product), with size classes of Large, Medium, and Small. A "Secondary Product" or "Related Product" is a product that is related to a directly affected product by a business rule. A product may be designated as both a "Directly Affected Product" and a "Secondary Product". In such a case, the product is considered to be a "Directly Affected Product." In the above example of a rule, an item of a size class of the same size family would be a related product. A "Trigger Priority" is a priority assigned to each trigger, where actions of triggers with higher priority supercede actions of triggers of lower priority. A "Filter" is a set of specified thresholds that a change must meet or exceed to become a trigger.

The system is set up by defining triggers and related actions, prioritizing triggers, defining business rules, and prioritizing business rules. The triggers may be defined by a system manager or an end user, or may be set up as a default by a system manager. This allows the end user to modify the settings at a later point. In addition, the triggers can also be "hardwired" into the program. A user interface 108 may be provided to allow a user to define certain aspects of the system, such as business rule hierarchy, trigger hierarchy, or threshold levels during this set-up step.

Data is then received from a data source (step 204). The data source may be one or more stores or other sources of data or the store computer system 104 of FIG. 1 and may be provided to the price updating system 100. Such data may be, for example, prices, competitor prices, costs, or new product information. The data may be provided on a periodic basis, such as daily or weekly.

A filter is used to identify triggers in the received data using thresholds (step 208). The filter may define a plurality of triggers. The triggers may be prioritized. The thresholds may include the percent of change and the extent of change. If an event provides a given change that does not meet the threshold criteria, the event may be recorded and added to future event changes. As previously mentioned, there are three kinds of triggers in this embodiment: product cost changes, competitive price changes, and new product introductions. In this embodiment, a competitive price change for a given product will become a trigger only if the event passes thresholds for significance, which may include percent of change, extent of price change (number of stores affected), and volume of sales affected. For a cost change, thresholds may include percent of change and the extent of change (number of stores). The thresholds may be user-specified.

The price updating system 100 may then perform actions related to the triggers (step 212). The actions change the price of the directly affected product. The actions are prioritized according to the priority of the trigger. In this embodiment of the invention, the actions are executed in an order of lowest priority to highest priority. Each time a price is changed, a database may record the action and the trigger causing the action. This is one method of allowing the higher priority actions to supercede the lower priority actions. Other embodiments may use other methods to implement prioritized actions. Conflicting actions may be related to triggers of the same priority, which would then require a tie-breaking process. In this embodiment, the tie-breaking process is determining the resulting prices from each action and selecting the action that provides the highest overall price. Other tie-breaking processes may be used.

A rule compliance process is then performed (step 216). The business rules are arranged in a hierarchy, in which business rules at a higher level are more important than those lower down. Higher priority business rules take precedence over lower priority business rules. If a business rule of higher priority is in conflict with a business rule of lower priority, then the higher priority business rule is applied. The guiding principle for bringing business rules into compliance is that it must be done with the minimal number of price changes. In this embodiment, if two business rules of equal priority are in conflict, the conflict is resolved by choosing the solution that results in the higher prices. In the preferred embodiment, a single business rule hierarchy is used for all triggers for a business. In other embodiments, each trigger may have a different set of business rules with different hierarchies. In such a case, hierarchies related to triggers with higher priorities will have higher priorities.

In some cases the business rules cannot be brought into compliance. In such cases the aim is to reduce the extent of the infeasibility, while changing as few prices as possible.

Figure 3:
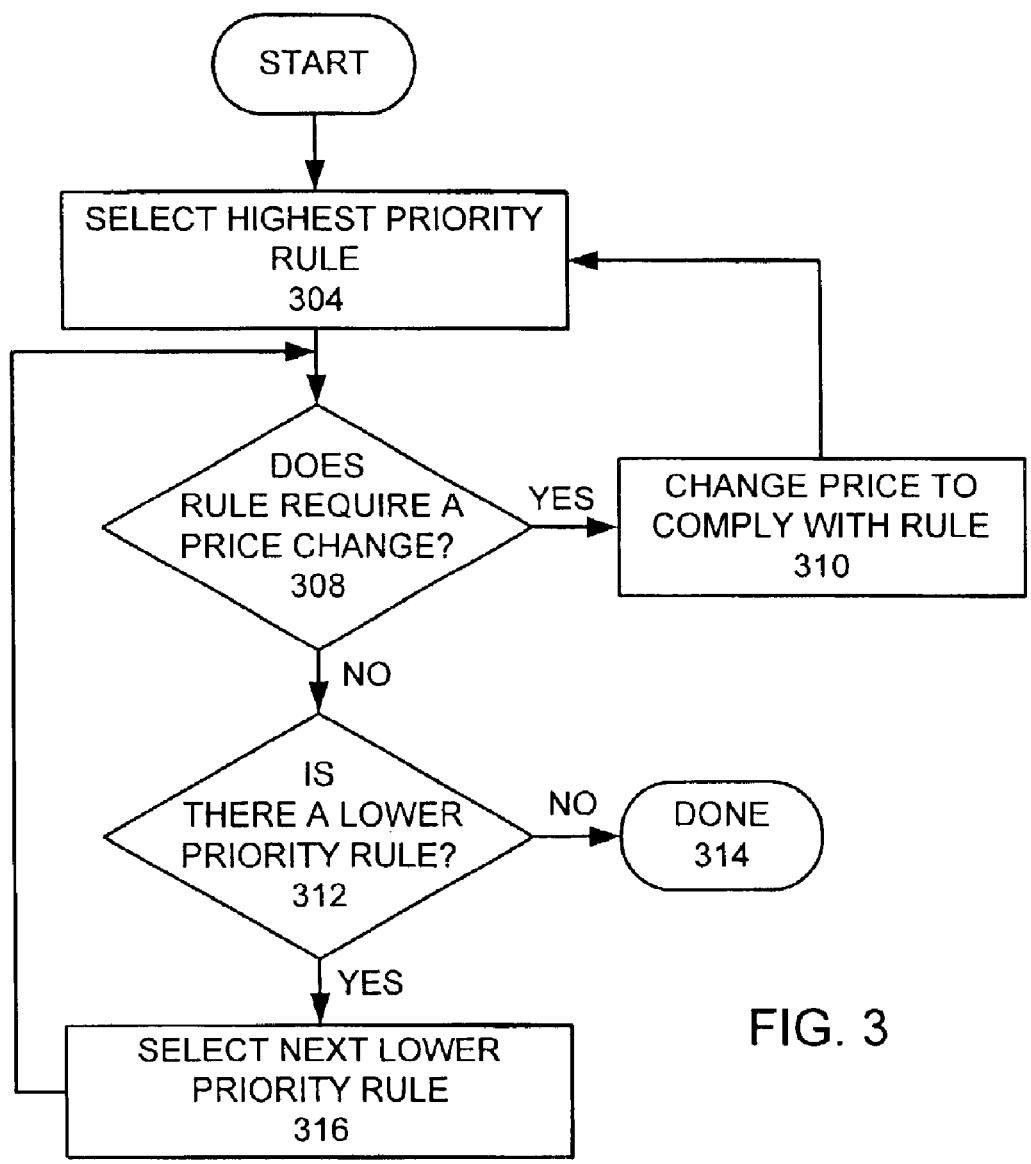
FIG. 3 is a more detailed flow chart of a rule compliance process.

FIG. 3 is a more detailed flow chart of one embodiment of a process for the rule compliance step (step 216). The rule compliance step adds rules iteratively in order of priority. The highest priority rules are selected first (step 304). The total infeasibility of these rules is reduced as much as possible by changing prices. The extent of the remaining infeasibility for the rules is recorded as the measure of rule compliance. The next iteration begins by adding the set of rules at the next level of priority. The total infeasibility for both sets of rules taken together is minimized. However, this is done while ensuring that the infeasibility measure recorded in the previous iteration for the first set of rules (at a higher priority) is maintained. The resulting level of infeasibility of the second set of rules is now recorded. The next set of rules of lower priority is added in the next iteration, and the process repeats until no more rules remain. At each iteration the infeasibility measure of the rules added in that iteration is minimized while keeping the compliance (infeasibility) measures of the previously added rules at their incoming level. The final step in the rule compliance process determines the minimal number of price changes required to reduce the infeasibilities of the rules to the levels recorded in the preceding iterations.

A determination is made on whether the selected rule requires a price change (step 308). If a price change is found to be required, the price is changed to comply with the rule to the extent possible (step 310), and then the process goes back to the step of selecting the highest priority rule (step 304). If it is determined that the selected rule does not require a price change (step 308) then a determination is made on whether there is a rule with a lower priority than the selected rule (step 312). If there is no lower priority rule than the selected rule, then the rule compliance step (step 216) is done (step 314). If there is a lower priority rule than the selected rule, then the next lower priority rule becomes the selected rule (step 316). Then the process goes back to the step of determining whether the selected rule requires a price change (step 308). A historical record of changes may be used to prevent lower priority rules from undoing a change by a higher priority rule.

The resulting updated prices may be provided to the stores (step 220). This allows the stores to update prices on a periodic basis.

Figure 4A:
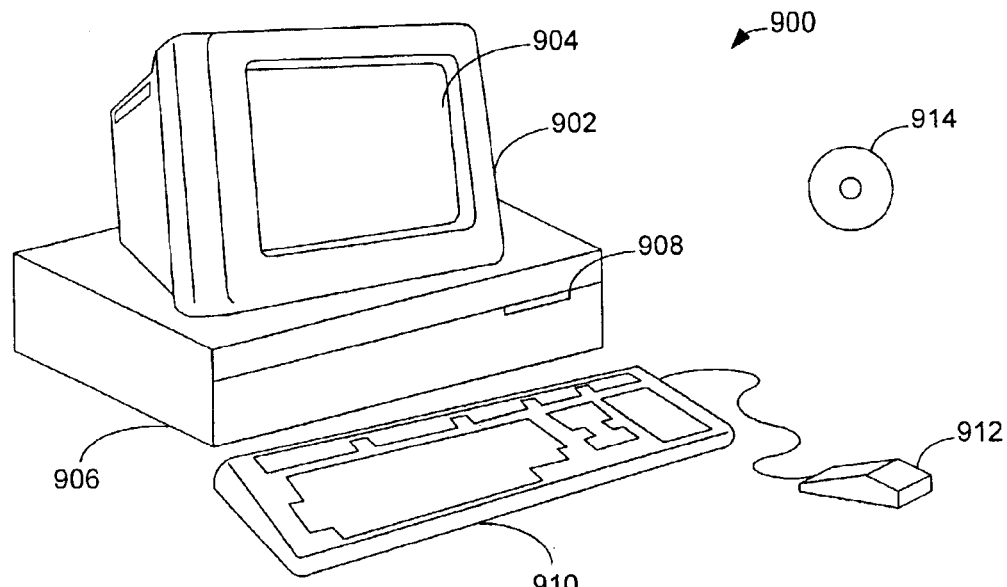
FIGS. 4A and 4B illustrate a computer system, which forms part of a network and is suitable for implementing embodiments of the present invention.
Figure 4B:
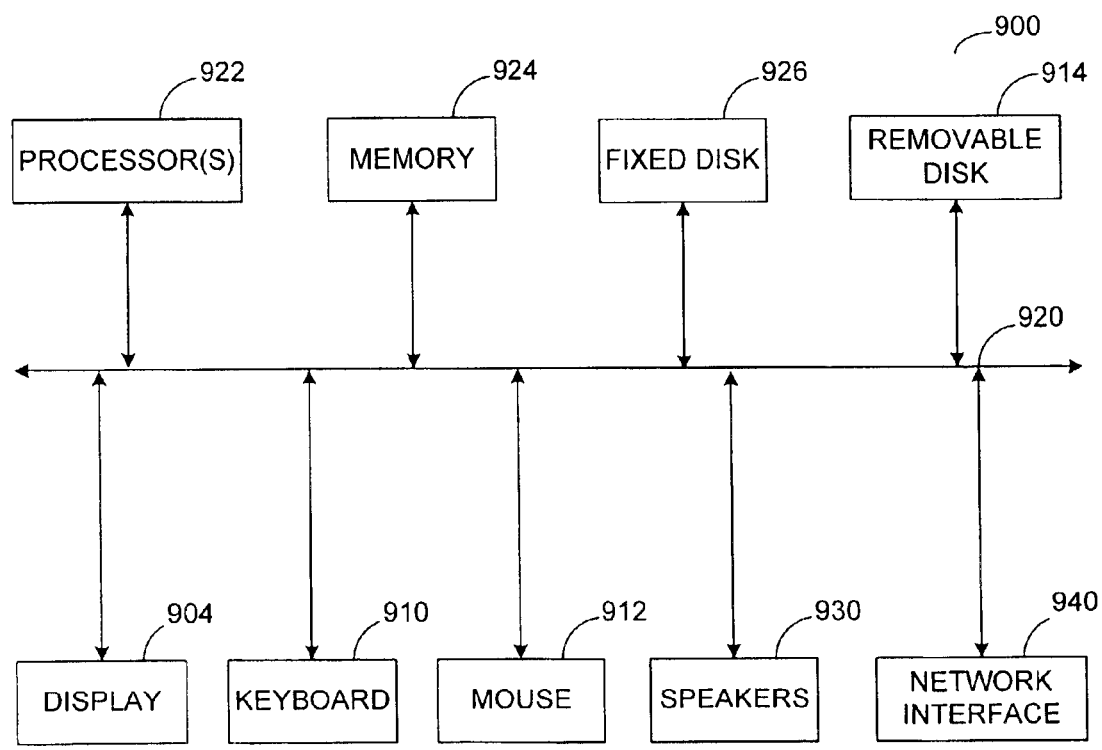

FIGS. 4A and 4B illustrate a computer system 900, which is suitable for implementing embodiments of the present invention. FIG. 4A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable type of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

EXAMPLES

The relationships between triggers, priorities, actions, and business rules may be illustrated by a Rule-Trigger Matrix as illustrated below:

| Trigger | Priority | Action | Business Rules |
| --- | --- | --- | --- |
| Environment Change (cost | Trigger priority. | Take this action or set of actions to adjust | Satisfy these rules to the extent possible |
| update, competitive price change, new product) | | the prices of affected products. | according to hierarchy. |

A sample Rule-Trigger Matrix is illustrated below:

| Trigger | Priority | Action | Business Rules |
| --- | --- | --- | --- |
| Cost Update | 1 | "Match price increase with cost increase" | Line Rules, Brand Rules, and Size Rules. |
| Competitive Price Change | 2 | "Bring corresponding product price within certain range of this new competitive price." | |
| New Products | 3 | "Set price to be Cost + 15%." | |

This table implies the following: Process the actions corresponding to the triggers in reverse order of priority— "New Products," "Competitive Price Change," and "Cost Update." If there are conflicts in the actions corresponding to triggers at different priorities, the actions required of the higher priority trigger are chosen. This means that the actions of "Cost Update" triggers take precedence over actions of "Competitive Price Change" triggers, which in turn trump the actions of "New Product" triggers. If there are conflicts in the actions required of triggers at the same level, the actions that result in higher prices are chosen as a tie-breaker. The tie-breaker definitions are used whenever necessary. In this example of Rule-Trigger Matrix for a cost update trigger, a match price increase with cost increase action is attached. A "match price increase with cost increase" action may raise or lower the price according to the raising or lowering of the cost. For the competitive price trigger, the action of bringing the corresponding product price within a certain range of the new competitive price action is attached. For the new products trigger, a set price to cost plus 15% action is attached or a retailer may be able to define the price on the new product.

Once the actions have been executed, a business rule compliance step is implemented. The business rules are in a hierarchy, and business rules at the top of the hierarchy must be satisfied before those lower down. In this example, Line Rules are satisfied before Brand Rules, and Brand Rules before Size Rules. The tie-breaker definitions are used whenever necessary.

Line, Brand, Size Examples

Products may have relationships with other products according to the line of product, the size of product, and the brand of product. The table below provides an example of different products. In this example, two brands of products are provided the first brand being National, and the second brand being HCF. Products a, b, c, d, w, x, y, z are the same National brand. In this example, for each brand there are two flavors of each product type, namely onions and jalapenos. Products a, b, c, d are the same flavor of the same brand, so that they are different size classes in the same size family. For each size family there are four size classes of 8, 15, 28, and 56. Products d, z, s, and n are the same size class. This results in sixteen individual products with Sku's a-d, k-n, p-s, and w-z, as shown in the table below.

|                            | Line 4 | Line 3 | Line 2 | Line 1 |
|----------------------------|--------|--------|--------|--------|
| National beans - onions    |        |        |        |        |
| Sku                        | a      | b      | c      | d      |
| Size                       | 8      | 15     | 28     | 56     |
| National beans - jalapeños |        |        |        |        |
| Sku                        | w      | x      | y      | z      |
| Size                       | 8      | 15     | 28     | 56     |
|                            | Line D | Line C | Line B | Line A |
| HCF beans - onions         |        |        |        |        |
| Sku                        | p      | q      | r      | s      |
| Size                       | 8      | 15     | 28     | 56     |
| HCF beans - jalapeños      |        |        |        |        |
| Sku                        | k      | l      | m      | n      |
| Size                       | 8      | 15     | 28     | 56     |

A simple example of a brand rule would be that the difference in price between different brands of the same size and same flavor would be a set value. For example, for products d and s, the difference in price d−s=J, where J is a constant.

In a simple example of a size rule, it may be specified that the per unit cost of a smaller item of a product type of a brand must be greater than a per unit cost of a larger item of the same product type and brand.

A line of products may be different flavors of the same size and same brand of a product type. Products d and z are in the same line. A simple line rule may be that all products in the same line are the same price.

Case I: Cost of Product d Goes Up

In this case, the cost of product d goes a sufficient amount to create a cost update trigger. In this case, a system is set up (step 202). To provide a simple case, only one trigger is specified in the Trigger-Rule Matrix. The single trigger is a cost update trigger. The action for the trigger is to match a price increase with a cost increase. The business rule hierarchy is that the line rule has the highest priority, the size rule has the next highest priority, and the brand rule has the lowest priority. The business rules provided above for line, size, and brand will be used.

The Trigger-Rule Matrix is

| Trigger        | Priority | Action                                | Business Rules        |
|----------------|----------|---------------------------------------|-----------------------|
| Cost Update    | 1        | "Match price increase with cost increase" | Line, Size, Brand |

Data is then received from the stores (step 204). In this case, the cost of product d has increased sufficiently to create a trigger. The data is filtered to identify that the cost of product d has increased more than a specified threshold (step 208). Actions related to the trigger are then performed (step 212). The only action specified in the Trigger-Rule Matrix is to match price increase with cost increase. An increase in the cost of product d requires an increase in the price of product d to match price increase with cost increase. As a result, the action increases the price of product d. Since only one action is specified, and only one trigger has been found, the actions are completed.

Next, a rule compliance is performed (step 216) according to the business rules and their hierarchy. The highest priority rule is selected (step 304). The business rule with the highest priority is the line rule, which specifies that different flavors of the same brand and size of product type should be the same. A determination is made as to whether the line rule requires a change in price (step 308). Since the price of product d has increased, the line rule states that the price of product z should be increased by the same amount. Since the selected rule (the line rule) requires a price change (step 308) the price of product z is increased to comply with the selected rule (step 310). In this example, none of the other line rules are infeasible and so require no further action. In general, it is possible that several rules of a given priority are infeasible and finding the lowest level of infeasibility possible will require them to be considered simultaneously. The total level of infeasibility, zero in this example, for the line rules is recorded and a determination is made on whether a lower priority rule exists (step 312). Since a lower priority rule exists, the next lower priority rule, the size rule, is selected (step 316). A determination is made as to whether the selected rule, the size rule, requires a price change (step 308). In this example, the increase in the price of product d has made the per unit cost of product d greater than the per unit cost of product c, which is a smaller size of the same brand and flavor. Therefore, the selected rule requires a price change, but this change must be done while maintaining the level of infeasibility of the line rule at its current level of zero. As a result, the price of product c is increased to comply with the size rule, and the price of product y is increased to equal the price of product c in order to maintain the feasibility of the line rule between them (step 310). Note that in this example, changing the prices in this way does not induce any additional infeasibilities in the set of rules being considered. The increase in prices of larger size products d, z, c, and y are not sufficient to violate the size rule regarding smaller size products a, b, w, and x. In general, price changes in the compliance phase would take these potential infeasibilities into account. After this step, the level of infeasibility of the line rules and the size rules are recorded separately.

The next highest priority rule is again selected (step 304). It is found that the brand rules have the next highest priority (step 312). The brand rules are then selected (step 316). It is determined that, since the price of product d increased, the difference between the price of product d and the price of product s has increased, violating the brand rule and requiring a price change (step 308). The price of product s is increased (step 310) and, to keep the line rules at their current level of compliance, the price of product n is increased to be equal to the price of s. The compliance measure of each of the other rules is unaffected and so the process stops.

The updated prices are then provided to the stores (step 220).

Case II: Cost of Product d Goes Up by $1 and that of Product z by 1.50

This case uses the same Trigger-Rule Matrix and same business rules and business rule hierarchy as the previous case. In this case, the cost of product d goes up by $1 and the cost of product z goes up by $1.50. In this case, a system is set up (step 202). To provide a simple case, only one trigger is specified in the Trigger-Rule Matrix. The single trigger is a cost update trigger. The action for the trigger is to match a price increase with the cost increase. The business rule hierarchy is that the line rule has the highest priority, the size rule has the next highest priority, and the brand rule has the lowest priority. The business rules provided above for line, size, and brand will be used.

Data is then received from the stores (step 204). In this case, the data indicates that the cost of product d has increased by $1 and the cost of product z is increased by $1.50. The data is filtered to identify that the cost of product d and product z have increased more than a specified threshold (step 208), so that each event is designated as a trigger. Actions related to the triggers are then performed (step 212). The only action specified in the Trigger-Rule Matrix is to match a price increase with a cost increase. An increase in the price of the product is required to match the price increase with cost the increase. As a result, the action for a first trigger increases the price of product d by $1.00 and the action for a second trigger increases the price of product z by $1.50. Since only one action is specified for each trigger, and only two triggers have been found, the actions are completed.

Next, a rule compliance is performed (step 216) according to the business rules and their hierarchy. In this case, a step by step process through the flow chart of FIG. 3 will not be provided, since an understanding of the step by step process of the flow chart of FIG. 3 has already been provided, and since other methods may be used in other embodiments of the invention. The line rule increases the price of product d by $0.50. There is a conflict with the line rule. One application of the line rule would lower the price of product z by $0.50 and another application of the line rule would increase the price of product d by $0.50. Since this example uses a tie breaker by using the rule that provides the highest prices, the application that increases the price of product d by $0.50 is performed. A size rule then is used to increase the price of product c. A line rule is then used to increase the price of product y. A brand rule is then used to increase the price of product s. A line rule is then used to increase the price of product n.

Case III: Cost of Product d Goes Up, Competitive Price on Product s Falls

In this case, the cost of product d rises a sufficient amount to create a cost update trigger and the competitive price on product s falls a sufficient amount to create a trigger. In this case, a system is set up (step 202). In this case, two triggers are specified in the Trigger-Rule Matrix. The highest priority trigger is a cost update trigger. The action for this trigger is to match a price increase with the cost increase. The lowest priority trigger is the competitive price change trigger. The action for this trigger is to maintain a maximum competitive price difference. The business rule hierarchy is that the line rule has the highest priority, the size rule has the next highest priority, and the brand rule has the lowest priority. The business rules provided above for line, size, and brand will be used.

The Trigger-Rule Matrix is

| Trigger | Priority | Action | Business Rules |
|---|---|---|---|
| Cost Update | 1 | "Match price increase with cost increase" | Line, Size, Brand |
| Competitive Price Change | 2 | "Maintain competitive price." | |

Data is then received from the stores (step 204). In this case, the data indicates that the cost of product d has increased and the competitive price of product s has fallen. The data is filtered to identify that the cost of product d has increased more than a specified threshold and the competitive price of product s has decreased by a specified threshold (step 208), so that each event is designated as a trigger.

Actions related to the triggers are then performed (step 212). In this embodiment, the lowest priority action is performed first. Since the competitive price change trigger has the lowest priority, the action of maintaining the competitive price of product s is first performed by lowering the price of product s. Next, the action related to the higher priority cost update trigger is performed. The price increase is matched with the cost increase by increasing the price of product d.

Next, a rule compliance is performed (step 216) according to the business rules and their hierarchy. In this case, a step by step process through the flow chart of FIG. 3 will not be provided, since an understanding of the step by step process of the flow chart of FIG. 3 has already been provided, and since other methods may be used in other embodiments of the invention. The line rule increases the price of product z. A size rule then is used to increase the price of product c. A line rule is then used to increase the price of product y. A brand rule is then used to increase the price of product s. Increasing the price of product s is in direct conflict with the action of decreasing the price of product s caused by the competitive price trigger. Since the price of product d was increased by the cost update trigger, which has a higher priority, and the price increase of product d is the cause of the price increase of product s, the price of product s is increased because the cost update trigger has a higher priority than the competitive price change trigger. A line rule is then used to increase the price of product n. Thus, in rule compliance, higher priority triggers are able to override lower priority triggers, in this embodiment of the invention.

Case IV: Cost of Product d Goes Up $1.00, Cost of Product c Goes Up 50 c

This case uses the same Trigger-Rule Matrix and same business rules and business rule hierarchy as the previous case. In this case, the cost of product d goes up by $1 and the cost of product c goes up by $0.50. In this case, a system is set up (step 202). The highest priority trigger is a cost update trigger. The action for this trigger is to a match price increase with cost a increase. The lowest priority trigger is the competitive price change trigger. The action for this trigger is to maintain a maximum competitive price difference. The business rule hierarchy is that the line rule has the highest priority, the size rule has the next highest priority, and the brand rule has the lowest priority. The business rules provided above for line, size, and brand will be used.

Data is then received from the stores (step 204). In this case, the cost of product d has increased by $1 and the cost of product c is increased by $0.50. The data is filtered to identify that the cost of product d and product c have increased more than a specified threshold (step 208), so that each event is designated as a trigger. Actions related to the triggers are then performed (step 212). The action specified in the Trigger-Rule Matrix for cost update triggers is to match a price increase with a cost increase. An increase in the cost of a product is required to match the price increase with the cost increase. As a result, the action for one trigger increases the price of product d by $1.00 and the action for a second trigger increases the price of product c by $0.50. Since only one action is specified for each trigger, and only two triggers have been found, the actions are completed.

Next, a rule compliance is performed (step 216) according to the business rules and their hierarchy. In this case, a step by step process through the flow chart of FIG. 3 will not be provided, since an understanding of the step by step process of the flow chart of FIG. 3 has already been provided, and since other methods may be used in other embodiments of the invention. The line rule increases the price of product z by $1.00. A size rule then is used to increase the price of product c. Although the price of product c was increased by an action, a subsequent rule may further increase the price of product c. Although the triggers that initially changed the prices have the same priority, a tie-breaker following the rule that provides the highest price should be followed. A line rule is then used to increase the price of product y. A brand rule is then used to increase the price of product s. A line rule is then used to increase the price of product n.

When a new product is introduced, the price may be provided by the retailer, by their category manager or pricing analyst. The relationship between the new product and other products may be specified. The relationships may specify line, brand and size relationships. The price of the new product or other products may be changed during a business rule compliance process. In an example, if the price from the retailer is $1.25, but the new product is placed in Line A, which has a price of $1.50 for all the products in the line prior to the Price Update, then the new products price will be changed to $1.50.

In one embodiment, a price optimization program may be used to provide a price optimization, which may be used as a metric to measure the price updates to an optimization standard.

In other embodiments, a "maintain the gross margin" action may be attached to a cost update trigger. In an example a "maintain the gross margin" action, a product may have a cost of $12.54 and a price of $16.99, which provides a gross margin of 26.19%. If the cost is increased by $1 to $13.54, then to maintain a gross margin of 26.19%, the price is increased to % 18.34. Other variants of maintaining the gross margin may be used.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for providing price updates for at least one item, comprising:
   receiving data which is price related;
   filtering the received data to identify triggers in the received data;
   performing actions related to identified triggers;
   performing business rule compliance according to a business rule hierarchy;
   providing updated prices including price changes for the at least one item in response to the price related data;
   defining a plurality of thresholds to identify triggers;
   defining actions related to each trigger of the plurality of triggers; and
   defining the business rule hierarchy.

2. The computer implemented method, as recited in claim 1, wherein the actions have a hierarchy, where performing the actions is done according to the hierarchy of the actions.

3. The computer implemented method, as recited in claim 2, wherein performing the business rule compliance is done according to the business rule hierarchy.

4. The computer implemented method, as recited in claim 3, wherein at least one of the triggers is selected from at least one of a new product trigger, a cost change trigger, and a competitor price change trigger.

5. The computer implemented method, as recited in claim 4, wherein at least one of the business rules is selected from at least one of a brand rule, a size rule, and a line rule.

6. The computer implemented method, as recited in claim 5, wherein the business rule hierarchy is user definable.

7. The computer implemented method, as recited in claim 6, wherein the triggers are prioritized and wherein the priority of the trigger is user defined.

8. The computer implemented method, as recited in claim 7, wherein the hierarchy of actions is defined by trigger priority.

9. The computer implemented method, as recited in claim 8, further comprising the step of allowing a user to set a plurality of price indicator ranges.

10. The computer implemented method, as recited in claim 9, further comprising using a tie-breaking process.

11. The computer implemented method, as recited in claim 6, wherein the triggers and actions are product specific.

12. A computer implemented method for providing price updates, comprising:
    receiving data;
    filtering the received data to identify triggers in the received data;
    performing actions related to identified triggers;
    performing business rule compliance according to a business rule hierarchy using a tie breaking process which selects a result that provides highest prices; and
    providing updated prices.

13. The computer implemented method, as recited in claim 12, wherein a single rule hierarchy is used for all triggers.

14. The computer implemented method, as recited in claim 13, wherein each action changes only the price of a product that triggered the action.

15. An apparatus for providing price updates for at least one item, comprising computer readable media, comprising:
    computer code for receiving data which is price related;
    computer code for filtering the received data to identify triggers in the received data;
    computer code for performing actions related to identified triggers;
    computer code for performing business rule compliance according to a business rule hierarchy;
    computer code for providing updated prices including price changes for the at least one item in response to the price related data;
    computer readable code for defining a plurality of thresholds to identify triggers;
    computer readable code for defining actions related to each trigger of the plurality of triggers; and
    computer readable code for defining the business rule hierarchy.

16. The apparatus, as recited in claim 15, wherein the actions have a hierarchy, where the computer readable codes for performing the actions performs the actions according to the hierarchy of the actions.

17. The apparatus, as recited in claim 16, further comprising computer readable code for providing a tie-breaking process.

* * * * *